United States Patent [19]

Matsuda et al.

[11] 4,036,801

[45] July 19, 1977

[54] AQUEOUS AMPHOTERIC POLYURETHANE HAVING BLOCKED NCO GROUPS AND PROCESS

[75] Inventors: Kazuo Matsuda; Hidemasa Ohmura; Takeyo Sakai, all of Wakayama, Japan

[73] Assignee: Kao Soap Co., Ltd., Tokyo, Japan

[21] Appl. No.: 705,267

[22] Filed: July 14, 1976

[30] Foreign Application Priority Data

July 31, 1975 Japan .................................. 50-93327

[51] Int. Cl.$^2$ .......................... C08G 18/80; C08J 3/06
[52] U.S. Cl. ...................... 260/29.2 TN; 260/75 NH; 260/77.5 AM; 260/77.5 TB
[58] Field of Search ............... 260/29.2 TN, 29.2 EP, 260/75 NH, 77.5 TB, 77.5 AM

[56] References Cited

U.S. PATENT DOCUMENTS

| | | | |
|---|---|---|---|
| 3,723,372 | 3/1973 | Wakimoto et al. | 260/29.2 TN |
| 3,799,854 | 3/1974 | Jerabek | 260/29.2 TN |
| 3,836,493 | 9/1974 | Matsuda et al. | 260/29.2 TN |
| 3,897,377 | 7/1975 | Broecker et al. | 260/29.2 TN |
| 3,903,031 | 9/1975 | Matsuda et al. | 260/29.2 TN |
| 3,903,032 | 9/1975 | Matsuda et al. | 260/29.2 TN |
| 3,928,271 | 12/1975 | Matsuda et al. | 260/29.2 TN |
| 3,932,561 | 1/1976 | Zamer | 260/29.2 TN |
| 3,947,338 | 3/1976 | Jerabek et al. | 260/29.2 TN |
| 3,951,897 | 4/1976 | Matsuda et al. | 260/29.2 TN |

*Primary Examiner*—Murray Tillman
*Assistant Examiner*—Arthur H. Koeckert
*Attorney, Agent, or Firm*—Blanchard, Flynn, Thiel, Boutell & Tanis

[57] ABSTRACT

An aqueous amphoteric polyurethane emulsion is prepared by reacting an isocyanate-terminated urethane prepolymer with an excess of a polyalkylene polyamine to form a polyurethane-urea-polyamine; reacting a portion of the free amino groups contained in the resulting product with a blocked polyisocyanate having one free isocyanate group; rendering the remaining amino groups contained in the resulting product amphoteric either (I) by reacting said amino groups with a compound selected from the group consisting of 1,3-propane sultone, 1,4-butane sultone, β-propiolactone, γ-butyrolactone, ε-caprolactone, δ-valerolactone and a monohalogenated sodium carboxylate having the formula

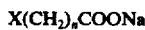

$$X(CH_2)_nCOONa$$

wherein X is halogen and $n$ is an integer of 1 and 2, in an amount such that the final polymer becomes emulsifiable, or (II) by reacting said amino groups with a compound selected from the group consisting of methyl acrylate, ethyl acrylate, methyl methacrylate, ethyl methacrylate and acrylonitrile, and then hydrolyzing the reaction product thus formed; and thereafter mixing the resulting polymer with water.

6 Claims, No Drawings

AQUEOUS AMPHOTERIC POLYURETHANE HAVING BLOCKED NCO GROUPS AND PROCESS

BACKGROUND OF THE INVENTION

1. FIELD OF THE INVENTION

This invention relates to a process for preparing a polyurethane emulsion. More specifically, the present invention relates to a process for the preparation of a homogeneous, stable, amphoteric, self-emulsified, aqueous, polyurethane emulsion.

2. DESCRIPTION OF THE PRIOR ART

Various methods have been known for preparing polyurethane emulsions. A typical conventional method comprises reacting a polyhydroxyl compound with an excess of an organic polyisocyanate thereby to form an isocyanate-terminated urethane prepolymer, chain-extending the resulting urethane prepolymer by the use of a chain extender having a tertiary amino group thereby to form a polyurethane composition having a tertiary amino group, quaternizing the tertiary amino group and thereafter mixing the resulting product with water or an aqueous solution of an acid so as to obtain a so-called "self-emulsified" polyurethane composition containing no emulsifier.

According to another conventional method, a polyurethane emulsion can be prepared, for example, by dispersing a polyurethane composition in water in the presence of an emulsifier.

Generally, a polyurethane resin has excellent physical and chemical properties. However, the physical and chemical properties of a polyurethane resin film prepared from the polyurethane emulsion that is obtained by the above-mentioned known method are remarkably inferior in comparison with the properties of a cross-linked type polyurethane resin, partly because it is difficult to introduce chemical cross-linkages into said polymer and partly because the emulsifier remains in the polyurethane resin.

When a polyurethane polymer contains strong cross-linkages, handling of the polymer in the production procedures has generally been very difficult, and in most cases, impossible, because of the poor meltability and poor solubility properties of the polymer. It has therefore been almost impossible to prepare an emulsion by dispersing such a cross-linked polymer in water. Even if the polyurethane can be dispersed in water, the resulting polyurethane emulsion is extremely unstable.

SUMMARY OF THE INVENTION

We have discovered a process for preparing an aqueous emulsion containing a polyurethane resin having excellent physical and chemical properties without introducing cross-linkages into the urethane resin prior to dispersion of the resin in water, without increasing the molecular weight of the polymer to such an extent as to reduce the stability of the emulsion and without using an emulsifier in such an amount as to cause reduction of the desired physical properties of the urethane resin. We have produced an amphoteric self-emulsified polyurethane emulsion having a functional group which is capable of forming cross-linkages when it is heated to a cross-linking temperature.

In particular, we have discovered a process for introducing an isocyanate-generating moiety (i.e. a blocked isocyanate group), which is known as a reactive functional group capable of forming cross-linkages upon heat-treatment of a urethane resin, into a polyurethane resin existing in the form of an aqueous emulsion, and confined that the cross-linking effect is excellent in practice.

In accordance with the present invention, there is provided a process for preparing a self-emulsified and self-crosslinkable aqueous amphoteric emulsion containing a polyurethane resin having excellent physical and chemical properties, said process comprising reacting a polyhydroxy compound with an excess of an organic polyisocyanate thereby to obtain an isocyanate-terminated urethane prepolymer, reacting the resulting urethane prepolymer with an excess of a polyalkylene polyamine thereby to obtain a polyurethane-urea-polyamine, reacting partially the free amino groups of the polyurethane-urea-polyamine with a blocked polyisocyanate having one free isocyanate group, rendering the remaining amino groups amphoteric and finally mixing the reaction product with water.

A polyurethane resin obtained by drying the polyurethane emulsion prepared in accordance with the present invention undergoes a heat-setting reaction upon heat-treatment and forms cross-linkages thereby to improve the properties thereof. It is therefore not necessary to increase the molecular weight of the polymer in the emulsion in advance to an extreme extent so as to improve the properties of the resin. For this reason the stability of the emulsion is extremely excellent.

The polyurethane-urea-polyamine used in preparing the composition of the present invention is prepared by reacting a polyalkylene polyamine, preferably in a ketone-type solvent, with an isocyanate-terminated urethane prepolymer which is produced by the reaction between a polyhydroxyl compound with an excess of a polyfunctional organic isocyanate.

Specific examples of the polyfunctional isocyanates include aromatic and aliphatic diisocyanates such as, for example, 1,5-naphthylene diisocyanate, 4,4'-diphenylmethane diisocyanate, 4,4'-diphenyldimethylmethane diisocyanate, di- and tetra-alkyl diphenylmethane diisocyanates, 4,4'-dibenzyl isocyanate, 1,3-phenylene diisocyanate, 1,4-phenylene diisocyanate, tolylene diisocyanate, chlorinated isocyanates, brominated isocyanates, phosphorous-containing isocyanates, butane-1,4-diisocyanate, hexane-1,6-diisocyanate, dicyclohexylmethane diisocyanate, cyclohexane-1,4-diisocyanate, xylylene diisocyanate, lysine diisocyanate and the like.

In addition to the above-mentioned diisocyanates, triisocyanates such as 1-methyl-benzole-2,4,6-triisocyanate, biphenyl-2,4,4'-triisocyanate, triphenylmethane-triisocyanate and the like can be used in combination with the foregoing diisocyanates.

The polyhydroxyl compound used for preparing the urethane prepolymer employed in the present invention generally has a molecular weight of 200 to 10,000. Those known polyhydroxyl compounds which are generally used for the preparation of polyurethanes can also be used in the present invention. Examples of the polyhydroxyl compounds are polyethers, polyesters, polyester amides, polyacetals, polythioethers, polybutadiene glycols and so forth.

As the polyethers which can be employed as the above-mentioned polyhydroxyl compounds, specific examples include polymers, copolymers or graft copolymers of tetrahydrofuran, ethylene oxide, propylene oxide, butylene oxide, and the like.

Likewise homogeneous polyethers or mixed polyethers can be used for the above-mentioned purpose, said polyethers being obtained by condensation of hexanediol, methylhexanediol, heptanediol, octanediol, etc.

Further, propoxylated or ethoxylated glycols can also be used. In addition, glycols such as bisphenol A or glycols obtained by adding an alkylene oxide such as ethylene oxide, propylene oxide, etc. to bisphenol A can be used.

As the polythioethers that can be employed as the afore-mentioned polyhydroxyl compound, it is especially preferred to use a thioglycol alone or a condensation product of a thioglycol with other glycols.

As examples of polyacetals, mention can be made of water-insoluble polyacetals such as those obtained from hexanediol and formaldehyde, or from 4,4'-dioxyethoxydiphenyl dimethylmethane and formaldehyde.

Typical examples of the afore-mentioned polyesters are polyester glycols that are obtained by the dehydrocondensation reaction between dibasic acids and a saturated or unsaturated low molecular weight glycol such as ethylene glycol, propylene glycol, 1,3-butanediol, 1,4-butanediol, neopentyl glycol, pentanediol, hexanediol, heptanediol, octanediol, 2-ethyl-1,3-hexanediol, 1,4-butynediol, bisphenol A, diethylene glycol, triethylene glycol, dipropylene glycol and glycols which are obtained by adding ethylene oxide, propylene oxide, etc. to bisphenol A; and also those polyester glycols which are obtained by the ring-opening polymerization of cyclic ester compounds.

The above-mentioned polyhydroxyl compounds can be used in combination with conventional glycols such as ethylene glycol, diethylene glycol, triethylene glycol, butanediol, propanediol, 1,6-hexanediol, neopentyl glycol and N-alkyl diethanolamines containing an alkyl group having 1 to 22 carbon atoms.

The preparation of the isocyanate-terminated urethane prepolymer that is used in the present invention is performed in the presence or absence of a solvent. When an aromatic polyisocyanate is used for reaction with the polyhydroxyl compound, the reaction temperature is in the range of 50° to 100° C. When an aromatic or aliphatic polyisocyanate is used for reaction with the polyhydroxyl compound, the reaction temperature is the range of 70° to 130° C.

In producing the above-mentioned urethane prepolymer, the amount of the polyisocyanate is selected so that all of the hydroxyl groups are reacted completely with the isocyanate groups. Thus, it is preferred that the ratio of the total number of the isocyanate groups to that of the reactive hydrogen atoms (OH group) is in the range of 1.1 : 1.0 to 5.0 : 1.0.

Various polyalkylene polyamines including polyethylene polyamine, polypropylene polyamine, polybutylene polyamine, etc. can be used as the polyalkylene polyamines that are used in the present invention.

More specifically, the polyalkylene polyamines used in the present invention are those polyamines whose nitrogen atoms are bonded to one another by a group of the formula —$C_nH_{2n}$— (wherein $n$ is an integer larger than 1) and which contains 2 to 4 of these groups in the molecule. The above-mentioned nitrogen atoms can be bonded to the adjacent carbon atoms in the group —$C_nH_{2n}$— but two nitrogen atoms are not directly bonded to the same carbon atoms.

The above-mentioned polyamines have the formula:

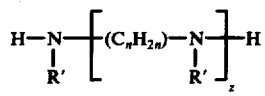

wherein $n$ is an integer larger than 1; $z$ is an integer from 2 to 4, which can be the same or different, R' is hydrogen, alkyl having one to 4 carbon atoms or hydroxyalkyl having 1 to 4 carbon atoms.

In addition to specific polyamines such as diethylene triamine, triethylene tetramine, tetraethylene pentamine and dipropylene triamine, mixtures of polyamines and various crude polyamines can be used as the polyalkylene polyamine.

Similarly, hydroxylalkyl-substituted polyamines may be used in the present invention.

In some cases, in order to change density of the hydrophilic groups contained in the polyurethane emulsion obtained in accordance with the present invention or to improve properties of the polyurethane resin, it is desired to increase the distance between the amino groups in the polyurethane-urea-polyamine molecule. The above-mentioned object can be accomplished by replacing a part of the polyalkylene polyamine with hydrazine, ethylene diamine, propylene diamine, hexamethylene diamine, piperazine, phenylene diamine, alkyl ($C_1$-$C_{22}$) -substituted diamines, and alkylene oxide adducts, acrylonitrile adducts or acrylic acid ester adducts of these diamines.

This object can be accomplished by replacing up to less than about 50 wt. % of the polyalkylene polyamine by the afore-mentioned diamines.

It is preferred to carry out the reaction between the isocyanate-terminated urethane prepolymer and the polyalkylene polyamine, under atmospheric pressure, at a reaction temperature of —20° C up to 70° C, in a solvent of the ketone-type.

Specific examples of the ketone-type solvent are acetone, methylethyl ketone, diethyl ketone, dipropyl ketone, methylisobutyl ketone and methylisopropyl ketone. It is preferred to use acetone and methylethyl ketone.

The above-mentioned ketone-type solvent can be used in combination with other solvents such as benzene, tetrahydrofuran, dioxane, acetic acid esters, dimethyl formamide and chlorinated hydrocarbon solvents.

The reaction time is determined by the reaction temperature and the reactivity of the polyisocyanate compound used. A shorter or a longer period of reaction time is employed depending upon the reaction conditions. The reaction is continued till the absorption due to the isocyanate group of the reaction mixture is no longer observed at 2250 cm$^{-1}$ in the infrared absorption spectrum. The reaction time is usually in the range of 0.5 to 2 hours.

In the reaction between the urethane prepolymer and polyalkylene polyamine in the present invention, it is critical that the total number of the primary and secondary amino groups exceeds the total number of the isocyanate groups. The closer is the total molar number of the amino groups to the total molar number of the isocyanate groups, the higher is the molecular weight of the resulting polyurethane-urea-polyamine. In this instance, however, the reaction product is obtained frequently in gel form or exhibits a remarkable tendency to gel. Also, if the ratio of the molar number of the amino groups is excessively large in comparison to the number of moles of the isocyanate group, there is often obtained a polyurethane-urea-polyamine having an unacceptable low molecular weight. If a polyurethane emulsion is prepared from such a low molecular weight product as the intermediate, the resin does not have excellent properties.

For the reasons described above, the ratio of the total number of moles of the primary and secondary amino groups (B) to the number of moles of the isocyanate groups (A) is in the range of $1 < B/A \leq 5$, preferably $1 < B/A$ 3. The molecular weight of the resulting polyurethane-urea-polyamine is preferably in the range of 5,000 to 100,000.

The polyurethane emulsion of the present invention is prepared using, as the intermediate, the polyurethane-urea-polyamine that is synthesized by the above-mentioned procedures. In order to provide the urethane resin in the polyurethane emulsion with self-cross-linkability, a blocked polyisocyanate having one free isocyanate group in the molecule is reacted with the free amino groups contained in said intermediate. This blocked polyisocyanate is synthesized by reacting polyisocyanates with various blocking agents for polyisocyanates. As the polyisocyanates for this purpose, there can be effectively used the afore-mentioned isocyanate-terminated urethane prepolymer and those polyisocyanates which have already been described as the starting compound for the preparation of said urethane prepolymer.

As typical examples of the above-mentioned blocking agent for the polyisocyanate, mention can be made of sulfites such as potassium hydrogen sulfite, sodium hydrogen sulfite, etc.; secondary amines such as diethylamine, dibutylamine, diphenylamine, butyl phenylamine, phenyl naphtylamine, etc.; tertiary alcohols such as tertiary-butyl alcohol; amides such as stearic acid amide, acetic acid amide, acryl amide, acetanilide; phenol derivatives such as ethyl phenol, tertiary-butyl phenol, hydroxybenzoic acid etc.; lactams such as ε-caprolactam, δ-valerolactam, γ-butyrolactam, β-propiolactam, etc.; oximes such as methyl ethyl ketoxime, benzophenone oxime, cyclohexanone oxime, acetaldoxime, acetoxime, etc.; imides such as maleic acid imide, succinic acid imide, phthalic acid imide, etc.; mercaptans such as tertiary-dodecyl mercaptan, tertiary-butyl mercaptan, butyl mercaptan, hexyl mercaptan, etc.; active methylene compounds such as dimethyl malonate, diethyl malonate, methyl acetacetate, ethyl acetacetate, acetyl acetone, etc.; hydrogen cyanide, ethylene imine, glycidol, hydroxylamine, pyrrolidone and the like.

The reaction between the polyisocyanate and the isocyanate blocking agent is usually carried out in the presence or absence of a solvent, at a temperature of 20° to 150° C, for 0.5 to 7 hours. It is important to select the amount of the isocyanate blocking agent such that one isocyanate group in each molecule of the polyisocyanate is left unreacted during the reaction. That is, a blocked polyisocyanate having one free isocyanate group can readily be prepared by reacting one mole of the polyisocyanate having P number of free isocyanate groups, per molecule thereof, with about (P − 1) mole(s) of the isocyanate blocking agent.

The thus-prepared blocked polyisocyanate having one free isocyanate group is then allowed to react with free amino groups of the polyurethane-urea-polyamide. The reaction is performed at −20° to 70° C, for 0.5 to 2 hours. The amount of said blocked polyisocyanate is in the range of from 0.1 to 0.7 moles of free isocyanate groups in said blocked polyisocyanate per one mole of the sum of the primary and secondary amino groups in said polyurethane-urea-polyamine.

The remaining amino groups contained in the thus-prepared polyurethane-urea-polyamine having the blocked isocyanate group are then rendered amphoteric by reaction at 40° to 70° C for 3 to 7 hours with an amphoterizing agent in such an amount sufficient to emulsify the final polymer. The amount of the amphoterizing agent is from 0.5 to 2.0 moles per mole of the sum of primary and secondary amino groups remaining in said polyurethane-urea-polyamine after reaction with said blocked polyisocyanate. By mixing the resulting product with water, there is obtained an amphoteric polyurethane emulsion as the desired final product.

The end of the amphoterization reaction can be determined by adding water to the reaction mixture and shaking the same. If a stable emulsion is formed the reaction is deemed complete.

The organic solvent used for the reaction is distilled off, preferably under reduced pressure, from the amphoteric emulsion thus prepared. Distillation of the organic solvent does not at all affect adversely the stability of the emulsion.

The amphoterization agent used in the present invention is a member selected from the group consisting of 1,3-propane sultone, 1,4-butane sultone, β-propiolactone, ε-caprolactone, δ-valerolactone and mono-halogenated sodium carboxylate having the formula

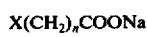

$$X(CH_2)_n COONa$$

wherein X is halogen and $n$ is an integer of 1 or 2.

Alternatively, the polyurethane-urea-polyamine having the blocked isocyanate group can be reacted with a compound selected from the group consisting of methyl acrylate, ethyl acrylate, methyl methacrylate, ethyl methacrylate and acrylonitrile, and the resulting product is then hydrolyzed at 40° to 70° for 2 to 5 hours for effecting amphoterization.

Specific examples of the mono-halogenated sodium carboxylates include sodium monochloroacetate, sodium monochloropropionate, sodium monobromoacetate, sodium monobromopropionate, sodium monoiodoacetate, sodium monoiodopropionate, sodium monofluoroacetate, sodium monofluoropropionate and the like. Of these, sodium monochloroacetate can be used advantageously on an industrial scale.

The above-mentioned amphoterization agent is reacted with the primary and secondary amino groups of the polyurethane-urea-polyamine having the blocked isocyanate group generally in a sufficient amount such that the final polymer becomes emulsifiable. The molar ratio of the amphoterization agent to the amino groups in the polyurethane-urea-polyamine having the blocked isocyanate group is preferably in the range of 0.5 to 2.0/1.0.

Drying of the polyurethane emulsion of the present invention yields a urethane resin. When the urethane resin is heated to a temperature of 50° to 200° C, free isocyanate groups are regenerated from the blocked isocyanate groups whereby the free isocyanate groups thus formed react with the amino groups, urethane linkages and are urea linkages in the resin to form cross-linkages thereby to greatly improve the properties of the urethane resin.

The self-emulsified and self-crosslinkable emulsion of the present invention contains generally 5 to 50 wt.% of the polyurethane resin. The emulsion can be used to improve various properties, e.g., surface coating, adhesion, feel, etc. of various articles such as fibrous materials, nonwoven fabrics, paper, leather, rubber, wood, metal, concrete, gypsum, glass, glass fiber, plastic and the like by impregnating the emulsion into these articles, or coating or spraying the emulsion onto the surface of these articles and then drying the same. The emulsion can also be used in the field of civil engineering and as an adhesive.

The polyurethane emulsion obtained in accordance with the present invention is a so-called self-emulsified emulsion which does not contain an emulsifier therein. However, known emulsifiers may also be added to the emulsion of the present invention in order further to improve the stability thereof provided that the amount of the emulsifier does not change the properties of the polyurethane resin drastically.

The present invention will be further described with reference to the following illustrative Examples, but it will be understood that these Examples are illustrative and are not limiting in any way.

In the Examples, the terms "part" and "%" are all by weight unless specified otherwise.

EXAMPLE 1

A. 174 parts of an 80 : 20 mixture of 2,4-tolylene diisocyanate and 2,6-tolylene diisocyanate and 174 parts of methylethyl ketone were charged into a flask equipped with a stirrer and a thermometer. A solution of 87 parts of methylethyl ketoxime dissolved in 348 parts of methylethyl ketone was added dropwise to the mixture over a period of 30 minutes.

The temperature inside the flask was 17° C at the start of the addition and it rose to 35° C at the end of the addition.

After 522 parts of methylethyl ketone was added, the mixture was reacted at 50° C for 30 minutes. Thus, there was obtained a methylethyl ketone solution of a blocked isocyanate compound having one free isocyanate group per molecule thereof.

The content of the free isocyanate group in this solution was 3.20%.

B. 202.5 parts of poly(ethylene adipate)glycol that had been dehydrated under reduced pressure at 90° C for 2 hours and having a hydroxyl value of 55.4, 101.7 parts of methylethyl ketone and 34.8 parts of an 80 : 20 mixture of 2,4-tolylene diisocyanate and 2,6-tolylene diisocyanate were charged into a round bottom flask and reacted at 80° C for 3 hours with agitation thereby to form a urethane prepolymer solution containing 2.45% of free isocyanate groups.

Separately 3.53 parts of diethylene triamine and 200 parts of methylethyl ketone were charged into another flask and mixed with each other. To this mixture was added 100 parts of the above-mentioned urethane prepolymer solution gradually over the period of 20 minutes. During this 20 minutes' time, the temperature of the reaction mixture rose from 21° C to 26° C. The reaction mixture was further heated and reacted at 50° C for 30 minutes thereby to yield a methylethyl ketone solution of a polyurethane-urea-polyamine.

Next, to 303.5 parts of the thus-obtained polyurethane-urea-polyamine solution was added 23.3 parts of the solution of the blocked isocyanate compound obtained in the above-mentioned step (A) and the mixture was reacted at 50° C for 30 minutes.

Next, 1.93 parts of β-propiolactone dissolved in 20 parts of methylethyl ketone was then added to the reaction mixture. The mixture was reacted again at 60° C for 4 hours. After 480 parts of ion-exchanged water was added, methylethyl ketone was distilled off from the reaction mixture under reduced pressure. The concentration of the solids was adjusted by adding the ion-exchanged water. Thus, there was obtained a homogeneous and stable emulsion having a low viscosity and a resin content of 15%.

The resulting emulsion was spread on a flat Teflon plate and then was air-dried, thereby yielding a soft rubbery film. After heat-treatment at 120° C for 20 minutes, the film had the following mechanical properties:

| 100% modulus | Tensile strength | Elongation |
|---|---|---|
| 24 kg/cm2 | 236 kg/cm2 | 550% |

Comparative Example 1

To 303.5 parts of the polyurethane-urea-polyamine solution prepared in the same way as in step (B) of Example 1 there was added a solution of 3.21 parts of β-propiolactone dissolved in 32 parts of methylethyl ketone and the mixture was reacted at 60° C for 4 hours. After 460 parts of ion-exchanged water was added, the solvent was distilled off under reduced pressure in the same way as described in Example 1 thereby to yield a homogeneous emulsion having a resin content of 15%.

A film was prepared from this emulsion in the same way as described in Example 1, and the heat treated film had the following mechanical properties:

| 100% modulus | Tensile strength | Elongation |
|---|---|---|
| 19 kg/cm2 | 171 kg/cm2 | 610% |

As can be appreciated clearly from a comparison of Example 1 with Comparative Example 1, the polymer film obtained by the method of Example 1 (i.e. the process of the present invention) had better properties than the one obtained by the method of Comparative Example 1. In addition, the heat-treated film of Example 1 underwent swelling in dimethyl formamide but it did not dissolve therein, whereas the film of Comparative Example 1 dissolved in dimethyl formamide.

EXAMPLE 2

A. 453 parts of methylethyl ketone, 96.05 parts of ε-caprolactam and 147.9 parts of an 80 : 20 mixture of 2,4-tolylene diisocyanate and 2,6-tolylene diisocyanate were charged into a round bottom flask and reacted at 70° C for one hour with agitation thereby to yield a methylethyl ketone solution of a blocked isocyanate compound having one free isocyanate group per molecule thereof.

B. 11.0 parts of the thus-formed methylethyl ketone solution of the blocked isocyanate compound was added to 303.5 parts of the polyurethane-urea-polyamine solution that was prepared in the same way as described in step (B) of Example 1, and the mixture was reacted at 55° C for 1 hour. Then 3.81 parts of 1,3-propane sultone dissolved in 40 parts of methylethyl ketone was added to this reaction mixture, and the mixture was reacted again at 50° C for 5 hours.

After 260 parts of water was added to the reaction mixture, the organic solvent was distilled off under reduced pressure at a temperature of 40° to 50° C. The concentration of the solids was adjusted by adding water thereto, thereby yielding a homogeneous and stable emulsion having a resin content of 25%.

In the same way as described in Example 1 a heat-treated film was prepared from this emulsion and it had the following mechanical properties:

| 100% modulus | Tensile strength | Elongation |
|---|---|---|
| 28 kg/cm2 | 259 kg/cm2 | 560% |

Comparative Example 2

5.44 parts of 1,3-propane sultone dissolved in 55 parts of methylethyl ketone was added to 303.5 parts of the polyurethane-urea-polyamine solution prepared in the same way as in step (B) of Example 2 and was reacted at 50° C for 5 hours. After 240 parts of water was added, the organic solvent was distilled off under reduced pressure at a temperature of 40° to 50° C. The concentration of the solids was adjusted by adding water thereto, thereby yielding a homogeneous emulsion having a resin content of 25%.

In the same way as described in Example 1 a heat-treated film was prepared from this emulsion and it had the following mechanical properties:

| 100% modulus | Tensile strength | Elongation |
|---|---|---|
| 20 kg/cm2 | 164 kg/cm2 | 670% |

As can be appreciated clearly from a comparison of Example 2 with Comparative Example 2, the polymer film obtained by the method of Example 2, according to the invention, had better properties than the one obtained by Comparative Example 2.

EXAMPLE 3

A. 17.4 parts of an 80 : 20 mixture of 2,4-tolylene diisocyanate and 2,6-tolylene diisocyanate and 98.6 parts of methylethyl ketone were charged into a round bottom flask. A solution of 7.3 parts of diethylamine dissolved in 41.4 parts of methylethyl ketone was added dropwise to the mixture over a period of 20 minutes at 9° to 10° C while cooling with ice and then was reacted at 50° C for 10 minutes thereby to yield a solution of a blocked isocyanate compound having one free isocyanate group per molecule thereof.

The free isocyanate group content in this solution was 2.55%.

B. 22.0 parts of the resulting solution of the blocked isocyanate compound prepared in (A) was added to 303.5 parts of the polyurethane-urea-polyamine solution that was prepared in the same was as in step (B) of Example 1, and was reacted at 40° C for 1 hour. 3.64 parts of sodium monochloroacetate was added to the reaction mixture and reacted again at 60° C for a further 4 hours.

When a small amount of the reaction mixture was added to water, the reaction mixture exhibited good emulsification. This confirmed that the amphoterization reaction with sodium monochloroacetate had proceeded.

After 350 parts of water was added to the reaction mixture, the organic solvent was distilled off under reduced pressure over a water bath at about 50° C. The concentration of the solids was adjusted by adding water thereto, thereby yielding a homogeneous emulsion having a resin content of 20%.

In the same way as described in Example 1 a heat-treated film was prepared from the emulsion and it had the following mechanical properties:

| 100% modulus | Tensile strength | Elongation |
|---|---|---|
| 23 kg/cm2 | 221 kg/cm2 | 640% |

COMPARATIVE EXAMPLE 3

5.20 parts of sodium monochloroacetate was added to 303.5 parts of the polyurethane-urea-polyamine solution prepared in the same way as in step (B) of Example 3 and reacted at 60° C for 4 hours. A small amount of the reaction mixture was taken out as a sample and mixed with water. The reaction mixture was mixed with the water homogeneously. This confirmed that the amphoterization by means of sodium monochloroacetate was completed.

340 parts of water was added to the reaction mixture and the organic solvent was distilled off under reduced pressure over a water bath at 50° C. The concentration of the residue was adjusted by the addition of water thereto, thereby yielding a homogeneous emulsion having a resin content of 20%.

A heat-treated polyurethane film was prepared from this emulsion in the same way as described in Example 1 and had the following mechanical properties:

| 100% modulus | Tensile strength | Elongation |
|---|---|---|
| 17 kg/cm2 | 149 kg/cm2 | 660% |

As can be appreciated clearly from a comparison of Example 3 with Comparative Example 3, the polymer film prepared by the method of Example 3, according to the present invention, exhibited superior properties.

EXAMPLE 4

A. 491.2 parts of dehydrated polytetramethylene ether glycol having a hydroxyl value of 114.2 and 168 parts of 1,6-hexamethylene diisocyanate were charged into a round bottom flask and reacted at 100° C for 3.5 hours with agitation thereby to yield a prepolymer having an isocyanate content of 6.35%. The prepolymer was diluted with 282.5 parts of benzene to form a prepolymer solution having a low viscosity.

400 parts of the prepolymer solution was charged into another flask, to which 41.8 parts of benzophenone oxime dissolved in 1167.2 parts of methylethyl ketone was added. Thus, the reaction was carried out at 50° C for 5 hours to yield a solution of a blocked isocyanate compound having a free isocyanate group content of 0.55%.

B. 200 parts of the prepolymer solution prepared in the above step (A) was added dropwise gradually to a mixed solution consisting of 18.24 parts of triethylene tetramine and 400 parts of acetone over the period of 30 minutes with vigorous agitation.

During the addition of the prepolymer solution, the temperature of the reaction mixture rose from 19° to 26° C. The reaction was carried out by heating the mixture externally to 50° C for 30 minutes thereby to yield a polyurethane-urea-polyamine solution. Using a droplet of this solution, the infrared absorption spectrum was measured, but the absorption at 2250 cm$^{-1}$ resulting from the free isocyanate group was not observed.

Next, to this polyurethane-urea-polyamine solution was added 435.5 parts of the solution of the blocked isocyanate compound prepared in the above-mentioned step (A) over a period of 15 minutes. After the reaction was carried out at 65° C for 1 hour, 31.3 parts of 1,4-butane sultone dissolved in 300 parts of methylethyl ketone was added. The mixture was then reacted for 2.5 hours.

After 1150 parts of water was added to the reaction mixture, the organic solvent was distilled off at 45° C under reduced pressure. The concentration of the solids was adjusted by the addition thereto of water, thereby yielding a homogeneous and stable emulsion having a resin content of 20%.

In the same way as described in Example 1, a heat-treated film was prepared from this emulsion and it had the following mechanical properties:

| 100% modulus | Tensile strength | Elongation |
|---|---|---|
| 27 kg/cm2 | 157 kg/cm2 | 710% |

EXAMPLE 5

275.5 parts of polyoxypropylene glycol having a hydroxyl value of 162.9 that had been dehydrated under reduced pressure at 100° C for 2 hours, 204.8 parts of benzene and 200.0 parts of diphenylmethane-4,4'-diisocyanate were charged into a round bottom flask equipped with a thermometer and a stirrer and reacted at 75° C for 3.5 hours thereby to yield a urethane prepolymer solution having a free isocyanate content of 4.90%.

14.1 parts of diethylene triamine and 400 parts of methylethyl ketone were charged into another flask, to which 200 parts of the urethane prepolymer solution prepared by the above-mentioned procedure was added dropwise over the period of 15 minutes. Thus, the reaction was carried out at 50° C for 30 minutes to yield polyurethane-urea-polyamine solution.

69.9 parts of the solution of the blocked isocyanate compound obtained in step (A) of Example 1 was added to the thus-formed reaction mixture and reacted at 50° C for 1 hour.

Next, 10.7 parts of methyl acrylate was added to the reaction mixture, heated with agitation at 70° C for 5 hours and thus reacted with the amino groups of the polyurethane-urea-polyamine. Subsequently 30 parts of water having dissolved therein 5.0 parts of caustic soda was added to the reaction mixture and heated with agitation to 60° C for 3 hours so as thereby to effect hyrolysis of the methyl ester.

After 450 parts of water and added, the solvent was distilled off under reduced pressure over a water bath kept at 55° C. The concentration of the solids was adjusted by the addition thereto of water, thereby yielding a homogeneous and stable emulsion having a resin content of 30%.

In the same way as described in Example 1 a heat-treated urethane film was prepared from this emulsion and it had the following mechanical properties:

| 100% modulus | Tensile strength | Elongation |
|---|---|---|
| 25 kg/cm2 | 187 kg/cm2 | 510% |

EXAMPLE 6

113.4 parts of dehydrated poly(butylene adipate)-glycol having a hydroxyl value of 49.5, 15.8 parts of a glycol, i.e. bisphenol A having one mole of ethylene oxide added to each of the two hydroxyl groups thereof ("G1672", a trade name; a product of Kao Atlas K.K.), 70.3 parts of methylethyl ketone and 34.8 parts of an 80 : 20 mixture of 2,4-tolylene diisocyanate and 2,6-tolylene diisocyanate were charged into a flask equipped with a stirrer and a thermometer and reacted at 75° C for 3 hours thereby to yield a urethane prepolymer solution having an isocyanate group content of 3.59%.

Separately 200 parts of acetone and 5.18 parts of diethylene triamine were charged into another flask, to which 100 parts of the urethane prepolymer solution obtained by the above procedure was added dropwise over a period of 20 minutes and then reacted at 50° C for 30 minutes thereby to yield a homogeneous solution of polyurethane-urea-polyamine.

Next, 16.1 parts of the blocked isocyanate compound obtained in Example 2 was added to the reaction mixture and reacted at 50° C for 1 hour. After 5.21 parts of ε-caprolactone was added, the reaction mixture was reacted further at 70° C for 6 hours.

After 370 parts of water was added, the solvent was distilled away under reduced pressure at about 50° C. The concentration of the solids was adjusted by the addition thereto of water, thereby yielding a stable and homogeneous emulsion having a resin content of 20%.

In the same way as in Example 1 a heat-treated urethane film was prepared from this emulsion and it had the following mechanical properties:

| 100% modulus | Tensile strength | Elongation |
|---|---|---|
| 43 kg/cm2 | 267 kg/cm2 | 490% |

The embodiments of the invention in which an exclusive property or privilege is claimed are defined as follows:

1. A process for preparing an aqueous amphoteric thermosetting polyurethane emulsion, which comprises:

1. reacting, in the liquid phase and in a ketone solvent, at a temperature of from −20° to +70° C, (A) isocyanate-terminated urethane prepolymer prepared by reacting organic polyhydroxyl component havin a molecular weight in the range of from 200 to 10,000 with an excess of organic polyisocyanate, with (B) an excess of polyalkylene polyamine having at least two primary or secondary amino groups, the total mole number of primary and secondary amino groups in the polyalkylene polyamine being greater than the total mole number of isocyanate groups in the isocyanate-terminated urethane prepolymer, the reaction being carried out until the presence of —NCO groups cannot be detected, whereby to form polyurethane-urea-polyamine, 2. reacting, in the liquid phase, the reaction product of step 1 with a blocked polyisocyanate having a single free isocyanate group in the molecule, at a temperature of −20° C to +70° C, for about 0.5 to 2 hours, 3. reacting the reaction product of step 2 with either (I) a compound selected from the group consisting of 1,3-propane sultone, 1,4-butane sultone, β-propiolactone, γ-butyrolactone, ε-caprolactone, δ-valerolactone and a compound having the formula $X(CH_2)_nCOONa$, wherein X is halogen and $n$ is one or 2, or (II) a compound selected from the group coonsisting of methyl acrylate, ethyl acrylate, methyl methacrylate, ethyl methacrylate and acrylonitrile, followed by hydrolysis of the reaction product, whereby to render amphoteric the reaction product of step 2, p1 4. adding water to the reaction product of step 3, and 5. treating the product of step 4 to remove the organic solvent therefrom and thereby obtaining an aqueous polyurethane emulsion as a final product.

2. A process according to claim 1, in which the reactant (B) includes up to 50 percent, by molecular equivalent, of diamines, or alkyleneoxide adducts, acrylonitrile adducts or acrylate adducts of diamines.

3. A process according to claim 1, in which the ratio of (b) the total mole number of amino groups containing active hydrogen atoms in the polyalkylene polyamine, to (a) the total mole number of isocyanate groups in said urethane prepolymer is the range of $1 < \leq 5$.

4. A process according to claim 1, in which said polyalkylene polyamine has the formula

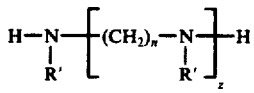

wherein $n$ is an integer larger than one, $z$ is an integer from 2 to 4 and R' is hydrogen, alkyl having one to 4 carbon atoms or hydroxylalkyl having one to 4 carbon atoms.

5. An aqueous amphoteric polyurethane emulsion prepared by the process of claim 1.

6. A polyurethane molded product prepared by forming the emulsion of claim 5 into a molded product and then heat-treating the product to effect crosslinking.

* * * * *